United States Patent [19]
Levy

[11] Patent Number: 5,985,952
[45] Date of Patent: Nov. 16, 1999

[54] RADIATION CURABLE PRIMARY COATING COMPOSITION FOR AN OPTICAL FIBER

[75] Inventor: Alvin C. Levy, Atlanta, Ga.

[73] Assignees: Alvin C. Levy & Associates, Inc., Atlanta; Master Adhesives, Inc., Norcross, both of Ga.

[21] Appl. No.: 09/046,304

[22] Filed: Mar. 23, 1998

[51] Int. Cl.⁶ ........................................................ C08F 2/46
[52] U.S. Cl. ......................... 522/102; 522/100; 522/122; 522/120; 522/121; 522/141; 522/170
[58] Field of Search .................................... 522/100, 102, 522/122, 143, 120, 121, 141, 170

[56] References Cited

U.S. PATENT DOCUMENTS

| | | |
|---|---|---|
| 3,367,992 | 2/1968 | Bearden . |
| 3,772,870 | 11/1973 | Wong et al. . |
| 4,099,837 | 7/1978 | Vazirani . |
| 4,311,726 | 1/1982 | Hacker et al. . |
| 4,383,091 | 5/1983 | Burton . |
| 4,694,029 | 9/1987 | Land ............................................ 522/8 |
| 4,902,727 | 2/1990 | Aoki et al. . |
| 5,015,709 | 5/1991 | Birkle et al. . |
| 5,057,587 | 10/1991 | Birkle et al. . |
| 5,146,531 | 9/1992 | Shustack . |
| 5,247,026 | 9/1993 | Erickson et al. . |
| 5,264,480 | 11/1993 | Bening et al. . |
| 5,336,563 | 8/1994 | Coady et al. . |
| 5,363,468 | 11/1994 | Yoshikawa et al. . |
| 5,373,578 | 12/1994 | Parker et al. . |
| 5,434,196 | 7/1995 | Ohkawa et al. ......................... 522/100 |
| 5,449,718 | 9/1995 | Erickson et al. . |
| 5,514,727 | 5/1996 | Green et al. ............................... 522/15 |
| 5,525,645 | 6/1996 | Ohkawa et al. ........................... 522/74 |
| 5,536,529 | 7/1996 | Shustack . |
| 5,536,772 | 7/1996 | Dillman et al. . |
| 5,538,791 | 7/1996 | Shustack . |
| 5,539,014 | 7/1996 | Swedo et al. .............................. 522/91 |
| 5,594,072 | 1/1997 | Handlin, Jr. et al. . |

FOREIGN PATENT DOCUMENTS

| | | |
|---|---|---|
| 0 124 057 A1 | 11/1984 | European Pat. Off. . |
| WO 91/03498 | 3/1991 | WIPO . |

*Primary Examiner*—James J. Seidleck
*Assistant Examiner*—Sanza L. McClendon
*Attorney, Agent, or Firm*—Needle & Rosenberg, P.C.

[57] ABSTRACT

The invention relates to a radiation curable primary coating composition for coating an optical fiber, composed of a component having a first end and a second end, a saturated aliphatic backbone, and at least one epoxide group at the first end of the component, and at least one reactive functional group at the second end; a mixture of acrylate monomers, composed of a first monomer having one acrylate group, and a second monomer having at least two acrylate groups; and a photoinitiator. The invention further relates to a radiation curable primary coating composition for coating an optical fiber, composed of a component having a first end and a second end, a saturated aliphatic backbone, and at least one epoxide group at the first end of the component, and at least one reactive functional group at the second end; a mixture of acrylate monomers, composed of a first monomer having one vinyl ether group, and a second monomer having at least two vinyl ether groups; and a photoinitiator. The invention further relates to a radiation curable primary coating composition for coating an optical fiber, a component having a first end and a second end, composed of a saturated aliphatic backbone, and at least one epoxide group at the first end of the component, and at least one first reactive functional group at the second end; a mixture of acrylate monomers, composed of a first monomer having one acrylate group, and a second monomer having at least two functional groups, comprising a second functional group and a third functional group; and a photoinitiator. The invention further relates to an optical fiber coated with the cured primary composition of the present invention.

75 Claims, No Drawings

RADIATION CURABLE PRIMARY COATING COMPOSITION FOR AN OPTICAL FIBER

FIELD OF THE INVENTION

The present invention relates to a radiation curable primary coating composition for an optical fiber and an optical fiber coated with the primary coating composition.

BACKGROUND OF THE INVENTION

Glass optical fibers require protective coatings to preserve the inherent strength of the glass and to buffer the fiber from microbending induced attenuation. Two coatings are generally used. The first coating, which is applied to the surface of the optical fiber, is generally referred to as the primary coating. The primary coating, once cured, is a soft, rubbery material that serves as a buffer to protect the fiber by relieving the stress created when the fiber is bent, cabled or spooled. The secondary or outer coating is applied over the primary coating. The secondary coating functions as a hard, protective layer that prevents damage to the glass fiber during processing and use.

Certain characteristics are desirable for the primary coating. The primary coating must maintain adequate adhesion to the glass fiber during thermal and hydrolytic aging, yet be strippable for splicing purposes.

The modulus of the primary coating must be low to cushion and protect the fiber by relieving stress on the fiber, which can induce microbending and, consequently, inefficient signal transmission. This cushioning effect must be maintained through a broad temperature range. Thus, it is necessary for the primary coating to have a low glass transition temperature (Tg). The low glass transition temperature will ensure that the coating remains in a rubbery state throughout a broad temperature range.

Another property the primary coating should possess is resistance to moisture. Moisture will rapidly degrade the strength of the primary coating and the underlying glass fiber during stress. Moisture will also adversely affect the adhesion of the primary coating to the glass, resulting in possible delamination. It is desirable for the coating to be as water resistant as possible. Moreover, the primary coating should be resistant to oils in filling compounds that are used to waterproof the fiber in the cable structure. Swelling of the primary coating by these oils can lead to signal attenuation.

It is also economical for manufacturers to apply the primary coating as rapidly as possible. Thus, the primary coating composition should undergo curing at higher line speeds.

Finally, the viscosity and shelf life of the primary coating is also important. Formulation stability of at least six to twelve months is considered good shelf life. Viscosity can typically be somewhat adjusted by regulation of the temperature at which the coatings are applied. However, it is advantageous to set the viscosity high enough so as to maintain proper rheology and handling of the coating, but low enough to facilitate bubble release and to minimize the amount of heat needed in the preparation. Excessive heat is undesirable because it may result in premature gelling or viscosity buildup due to possible thermal initiation of polymerization.

The use of urethane oligomers possessing terminal reactive groups in the primary coating for optical fibers is known in the art. U.S. Pat. Nos. 5,536,529 and 5,538,791 to Shustack; U.S. Pat. No. 5,336,563 to Coady et al.; U.S. Pat. No. 5,373,578 to Parker et al.; and International Patent Application No. WO 91/03498 to Vandeberg et al. disclose the preparation and application of urethane oligomers to glass fibers and other articles. The preparation of the prior art urethane oligomer typically involves the reaction between an organic isocyanate compound and an alcohol. In some cases, the urethane oligomer possesses terminal acrylate and vinyl ether groups. None of these references, however, disclose curing the liquid polymers or oligomers of the present invention with functional monomers such as acrylates or vinyl ethers.

The use of urethane oligomers possessing terminal reactive groups in the secondary coating is disclosed in U.S. Pat. No. 5,015,709 to Birkle et al. and U.S. Pat. No. 4,902,727 to Aoki et al. These references, however, do not disclose curing a liquid polymer or oligomer of the present invention with functional monomers such as acrylates and vinyl ethers.

The use of epoxidized diene polymers possessing hydroxyl groups for the preparation of coating compositions is disclosed in U.S. Pat. No. 5,264,480 to Bening et al. These polymers react with isocyanates to produce coating compositions. There is no disclosure in Bening et al., however, of adding other components such as acrylates and vinyl ethers to produce the coating composition.

U.S. Pat. No. 5,536,772 to Dillman et al. discloses the preparation of a coating composition for an optical fiber composed of an unsaturated epoxidized diene polymer and a tackifying resin. The coating composition also contains radiation curable diluents such as acrylates, methacrylates, and vinyl ethers. There is no disclosure in Dillman et al. of the types of acrylates, methacrylates, and vinyl ethers that are used. Moreover, Dillman et al. does not disclose the use of two or more acrylate or vinyl ether monomers or an acrylate monomer in combination with another monomer to produce a primary coating composition.

U.S. Pat. No. 5,247,026 to Erickson et al. discloses the preparation of a coating composition composed of an epoxidized diene star polymer. Similar to the disclosure of Dillman et al., Erickson et al. also discloses that the coating composition also contains radiation curable diluents such as acrylates, methacrylates, and vinyl ethers. However, Erickson et al. does not disclose the use of two or more acrylate or vinyl ether monomers or an acrylate monomer in combination with another monomer to produce a primary coating composition.

European Patent Application No. 0 124 057 to Pasternack et al. discloses coating an optical fiber with an ultraviolet-initiated, cationically curable polyepoxide, a polysiloxane with a plurality of hydroxyl groups, and a photoinitiator and/or photosensitizer. There is no disclosure in Pasternack et al. to use functionalized monomers such as acrylates or vinyl ethers in the coating composition.

In light of the above, it would be very desirable to have a primary coating composition that possesses enhanced or increased thermal and hydrolytic stability. Another object of the present invention is to produce a primary coating that increases or enhances the static fatigue strength of a glass fiber. Finally, it would be advantageous to use starting materials that are less expensive than those used in the prior art to produce a primary coating composition for a glass fiber. The present invention solves such a need in the art while providing surprising advantages.

SUMMARY OF THE INVENTION

In accordance with the purpose(s) of this invention, as embodied and broadly described herein, this invention, in one aspect, relates to a radiation curable primary coating composition for coating an optical fiber, comprising:

(a) a component having a first end and a second end, comprising:
   i) a saturated aliphatic backbone, and
   ii) at least one epoxide group at the first end of component (a), and at least one reactive functional group at the second end of component (a);
(b) a mixture of acrylate monomers, comprising
   iii) a first monomer having one acrylate group, and
   iv) a second monomer having at least two acrylate groups; and
c) a photoinitiator.

The invention further relates to a radiation curable primary coating composition for coating an optical fiber, comprising:
(a) a component having a first end and a second end, comprising:
   i) a saturated aliphatic backbone, and
   ii) at least one epoxide group at the first end of component (a), and at least one first reactive functional group at the second end of component (a); and
(b) a mixture of monomers, comprising
   iii) a first monomer having one acrylate group or vinyl ether group, and
   iv) a second monomer having at least two functional groups, comprising a second functional group and a third functional group, and
(c) a photoinitiator.

The invention further relates to a radiation curable primary coating composition for coating an optical fiber, comprising:
(a) a component having a first end and a second end, comprising:
   i) a saturated aliphatic backbone, and
   ii) at least one epoxide group at the first end of component (a), and at least one reactive functional group at the second end of component (a); and
(b) a mixture of vinyl ether monomers, comprising
   iii) a first monomer having one vinyl ether group, and
   iv) a second monomer having at least two vinyl ether groups; and
(c) a photoinitiator.

The invention further relates to a radiation curable primary coating composition for coating an optical fiber, comprising:
(a) a component having a first end and a second end, comprising:
   i) a saturated aliphatic backbone, and
   ii) at least one epoxide group at the first end of component (a), and at least one reactive functional group at the second end of component (a);
(b) a monoacrylate having from 6 to 20 carbon atoms; and
(c) a photoinitiator.

The invention also relates to an article comprising an optical fiber and a composition of the present invention wherein the composition has been cured as the primary coating composition on the optical fiber.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one reactive functional group at the second end of component (a);
(b) a mixture of acrylate monomers, comprising
   iii) a first monomer having one acrylate group, and
   iv) a second monomer having at least two acrylate groups; and
c) a photoinitiator,
wherein the composition has been cured as the primary coating composition on the optical fiber.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one first reactive functional group at the second end of component (a); and
(b) a mixture of monomers, comprising
   iii) a first monomer having one acrylate group, and
   iv) a second monomer having at least two functional groups, comprising a second functional group and a third functional group, and
(c) a photoinitiator,
wherein the composition has been cured as the primary coating composition on the optical fiber.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one reactive functional group at the second end of component (a); and
(b) a mixture of vinyl ether monomers, comprising
   iii) a first monomer having one vinyl ether group, and
   iv) a second monomer having at least two vinyl ether groups; and
(c) a photoinitiator,
wherein the composition has been cured as the primary coating composition on the optical fiber.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one reactive functional group at the second end of component (a);
(b) a monoacrylate having from 6 to 20 carbon atoms; and
(c) a photoinitiator,
wherein the composition has been cured as the primary coating composition on the optical fiber.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions and articles are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where the event or circumstance occurs and instances where it does not.

In accordance with the purpose(s) of this invention, as embodied and broadly described herein, this invention, in one aspect, relates to a radiation curable primary coating composition for coating an optical fiber, comprising:

(a) a component having a first end and a second end, comprising:
  i) a saturated aliphatic backbone, and
  ii) at least one epoxide group at the first end of component (a), and at least one reactive functional group at the second end of component (a);
(b) a mixture of acrylate monomers, comprising
  iii) a first monomer having one acrylate group, and
  iv) a second monomer having at least two acrylate groups; and
(c) a photoinitiator.

Components (a), (b) iii, and (b) iv are three, distinct components that are used to prepare the coating composition of the present invention.

Component (a) of the present invention is preferably a hetero-telechelic polymer that has at least one reactive functional reactive group at one end of the polymer and at least one epoxide group at the other end of the polymer. In one embodiment, component (a) is a liquid polymer or oligomer. Component (a) of the present invention is typically prepared by the polymerization of a conjugated diolefin to produce a polydiene. The polydiene is then epoxidized and hydrogenated to produce the hetero-telechelic polymer. The epoxidation and hydrogenation steps can be performed in any order. Methods for preparing component (a) and examples of component (a) of the present invention are disclosed in U.S. Pat. No. 5,247,026 to Erickson et al., U.S. Pat. No. 5,536,772 to Dillman et al., and U.S. Pat. No. 5,264,480 to Bening et al., which are all herein incorporated by this reference in their entirety.

In one embodiment, a conjugated diolefin having from 4 to 24 carbon atoms can be polymerized anionically to produce component (a). Examples of conjugated dienes useful for preparing component (a) of the present invention include, but are not limited to, isoprene; 1,4-butadiene; 1,2-butadiene; 2-methyl-1,3-butadiene; 2-ethyl-1,3-butadiene; 2-butyl-1,3-butadiene; 2-pentyl-1,3-butadiene; 2-hexyl-1,3-butadiene; 2-heptyl-1,3-butadiene; 2-octyl-1,3-butadiene; 2-nonyl-1,3-butadiene; 2-decyl-1,3-butadiene; 2-dodecyl-1,3-butadiene; 2-tetradecyl-1,3-butadiene; 2-hexadecyl-1,3-butadiene; 2-isoamyl-1,3-butadiene; 2-phenyl-1,3-butadiene; 2-methyl-1,3-pentadiene; 2-methyl-1,3-hexadiene; 2-methyl-1,3-heptadiene; 2-methyl-1,3-octadiene; and 2-methyl-6-methylene-2,7-octadiene. Other examples of conjugated dienes include, but are not limited to, 2-methyl-1,3-nonyldiene; 2-methyl-1,3-decyldiend; 2-methyl-1,3-dodecyldiene, and the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl, and 2-phenyl compounds. Other conjugated dienes include 1,3-butadiene, piperylene, and 4,5-diethyl-1,3-octadiene. Disubstituted conjugated dienes include, but are not limited to, 2,3-dimethyl-1,3-butadiene; 2,3-dimethyl-1,3-pentadiene; 2,3-dimethyl-1,3-hexadiene; 2,3-dimethyl-1,3-heptadiene; and 2,3-dimethyl-1,3-octadiene. Difluoro conjugated dienes useful for the preparation of component (a) include, but are not limited to, 2,3-difluoro-1,3-butadiene; 2,3-difluoro-1,3-pentadiene; 2,3-difluoro-1,3-hexadiene; 2,3-difluoro-1,3-heptadiene; and 2,3-difluoro-1,3-octadiene. Alkenyl aromatic hydrocarbons such as styrene, alkyl substituted styrene, alkoxy-substituted styrenes, vinyl naphthalene, and alkyl-substituted vinyl naphthalenes can be copolymerized with the conjugated dienes listed above.

In one embodiment, the aliphatic backbone of component (a) is saturated and unsubstituted. In a preferred embodiment, the aliphatic backbone of component (a) is poly(ethylene/butylene).

Depending upon the diene or olefin that is polymerized to generate the aliphatic backbone of component (a), a number of different groups can be attached to the aliphatic backbone. The term "attached" is defined as a group that is not incorporated within the aliphatic backbone. In one embodiment, an aliphatic group, a cycloaliphatic group, an aryl group or a combination thereof is attached to the saturated aliphatic backbone. In another embodiment, a phenyl group is attached to the aliphatic backbone. In one embodiment, the aliphatic backbone of component (a) is poly(ethylene/butylene/styrene).

The number of epoxide groups at the first end of component (a) can vary depending upon the method used to epoxidize the polymer. Conditions are selected in order to epoxidize the highly substituted olefinic double bonds. In one embodiment, peracetic acid is suitable for the epoxidation of the polydiene. In another embodiment, the number of epoxide groups at the first end of component (a) is from 5 to 15, preferably from 9 to 11 epoxide groups.

The second end of component (a) has a reactive functional group. The term "reactive functional group" for component (a) is any group capable of reacting with a compound including, but not limited to, an acrylate; a vinyl ether; an epoxide; an alcohol; or an isocyanate. Examples of reactive functional groups present at the second end of component (a) of the present invention include, but are not limited to, a hydroxyl group, an acrylate group, an epoxy group, a vinyl ether group, or a combination thereof. In a preferred embodiment, the reactive functional group is a hydroxyl group. When the reactive functional group is a hydroxyl group, it is possible to convert the hydroxyl group to other reactive functional reactive groups using techniques known in the art.

Component (a) can be prepared in a number of different shapes depending upon the polymerization technique used to prepare the polymer. In one embodiment, component (a) is linear, star or radial, preferably linear.

The molecular weight of component (a) can affect the ability of the polymer to cure. Low molecular weight polymers require excessive crosslinking in order to cure. Crosslinking occurs during the curing of the composition of the invention, which enhances the physical properties of the cured composition. The term "crosslinking" is defined as the reaction between an epoxide group of a first component (a) with an epoxide group or the reactive functional group of a second component (a).

Crosslinking can also occur within the same polymer, such that the reactive functional group at the second end of component (a) can react with an epoxide group at the first end. The reaction typically involves ring-opening of the epoxide by the reactive functional group. The crosslinking of component (a) results in the formation of a network or lattice. If the molecular weight of the polymer is too high, then it is difficult to apply the polymer on the a substrate by melt or other means. In one embodiment, the molecular weight of component (a) is from 3,000 to 15,000, preferably from 5,000 to 7,000, more preferably 6,000.

In one embodiment, component (a) has from 9 to 11 epoxide groups at the first end of component (a), a hydroxyl group at the second end of component (a), and the saturated aliphatic backbone is linear. In a preferred embodiment, component (a) is KRATON LIQUID® polymers L-207 and EKP-206, which are manufactured by Shell Oil Company, Houston, Tex. L-207 is a linear polymer with a poly(ethylene/butylene) backbone, a hydroxyl group at one terminus of the polymer, and epoxide groups at the other terminus. EKP-206 is a linear polymer with a poly(ethylene/butylene/styrene) backbone, a hydroxyl group at one terminus of the polymer, and epoxide groups at the other terminus.

In one embodiment, the amount of component (a) is from 40 to 80%, preferably from 55 to 75% by weight of the total composition.

In one embodiment of the invention, Applicant has discovered that by combining a mixture of monomers possessing functional groups (component (b)) with component (a), it is possible to enhance or increase the physical properties of the primary coating. The term "enhance" is defined as an increase in a desired effect and/or an increase in the duration of the desired effect. The functional monomers used in the present invention in component (b) reduce the viscosity of component (a) so that it facilitates the application of the coating to the fiber. One advantage of the present invention is that by changing the type and amount of the functional monomer, it is possible to alter or modify the viscosity of the coating composition.

As described above, component (a) crosslinks with itself to form a network or lattice. In one embodiment, the first monomer, the second monomer, and the photoinitiator can also crosslink with component (a) if the first monomer, second monomer, and photoinitiator are capable of reacting with the epoxide or hydroxyl groups of component (a). In a preferred embodiment, when the functional monomers (component (b)) are polymerized, the resultant polymer is interwoven through the polymer network produced by the crosslinking of component (a). This is referred to as an interpenetrating network (IPN). In this embodiment, component (b) reacts with itself and not component (a).

The primary coating composition has a number of advantages over prior art coatings. First, the coating composition possesses increased thermal and hydrolytic stability. Second, the primary coating composition of the present invention imparts greater static fatigue strength to the glass fiber. Finally, the primary coating composition has a modulus that is in the range required to function as a primary coating for an optical fiber.

Although a monofunctional monomer in the absence of a second monomer can be used in this invention, applicant has discovered that the use of a monofunctional monomer in the absence of the second monomer results in the formation of a coating composition that is inferior to the coating compositions of the present invention that are directed to a mixture of a monofunctional monomer and a multifunctional monomer. The present invention demonstrates the advantages of using a second monomer with two or more functional groups to produce a primary coating composition with superior physical and mechanical properties. First, the use of the second monomer permits the modification of the viscosity of the primary coating. Second, the second monomer cures at high speeds when the coating composition is exposed to ultraviolet light. Finally, the second monomer provides the latitude necessary to adjust the mechanical properties of the cured primary coating while maintaining the high thermohydrolytic and thermooxidative stability of component (a) in the cured state.

In one embodiment, the functional monomer comprises a mixture of acrylates comprising a first monomer having one acrylate group and a second monomer having at least two acrylate groups. In one embodiment, the first monomer is an acrylate from $C_6$ to $C_{20}$, preferably from $C_8$ to $C_{15}$. The range of carbon atoms is for the organic group of the ester (i.e. $H_2C$=$CHCO_2R$, where R is from $C_6$ to $C_{20}$). The term acrylate also includes methacrylates as well. In one embodiment, the first monomer comprises octyl acrylate, decyl acrylate, tridecyl acrylate, stearyl acrylate, lauryl acrylate or a combination thereof, preferably octyl acrylate, decyl acrylate, or tridecyl acrylate. The terms "octyl" and "decyl" include all structural isomers, such as isooctyl, isodecyl, n-octyl, and n-decyl.

Examples of useful first monomers include, but are not limited to, allyl methacrylate, tetrahydrofurfuryl methacrylate, isodecyl methacrylate, 2-(2-ethoxyethoxy)-ethylacrylate, stearyl acrylate, tetrahydrofurfuryl acrylate, lauryl methacrylate, stearyl acrylate, lauryl acrylate, 2-phenoxyethyl acrylate, 2-phenoxyethyl methacrylate, glycidyl methacrylate, isodecyl acrylate, isobornyl methacrylate, isooctyl acrylate, tridecyl acrylate, tridecyl methacrylate, caprolactone acrylate, ethoxylated nonyl phenol acrylate, isobornyl acrylate, polypropylene glycol monomethacrylate or a combination thereof. In another embodiment, the first monomer comprises ODA-N®, which is a mixture of octyl acrylate and decyl acrylate, EBECRYL 110®, which is an ethoxylated phenol acrylate monomer, EBECRYL 111®, which is an epoxy monoacrylate, or EBECRYL CL 1039®, which is a urethane monoacrylate. These monoacrylates are manufactured by UCB Chemicals Corporation, Smyrna, Ga. In a preferred embodiment, the first monomer is octyl acrylate, decyl acrylate, tridecyl acrylate, isodecyl acrylate, or isobornyl acrylate, or a combination thereof.

In another embodiment, the first monomer is from 10 to 50% by weight, preferably from 15 to 30% by weight of the total composition.

The second monomer is an acrylate of from $C_4$ to $C_{20}$. In one embodiment, the second monomer has two acrylate groups. In one embodiment, the second monomer comprises 1,6-hexanediol diacrylate; tripropylene glycol diacrylate; 1,3-butylene glycol diacrylate; 1,4-butylene glycol diacrylate; neopentyl glycol diacrylate; triethylene glycol dimethacrylate; ethylene glycol dimethacrylate; tetraethylene glycol dimethacrylate; polyethylene glycol dimethacrylate; 1,3-butylene glycol diacrylate; 1,4-butanediol diacrylate; 1,4-butanediol dimethacrylate; diethylene glycol diacrylate; diethylene glycol dimethacrylate; 1,6-hexanediol diacrylate; neopentyl glycol dimethacrylate; polyethylene glycol (600) dimethacrylate; polyethylene glycol (200) diacrylate; tetraethylene glycol diacrylate; triethylene glycol diacrylate; polyethylene glycol (400) diacrylate; polyethylene glycol (400) dimethacrylate; polyethylene glycol (600) diacrylate; or dipropylene glycol diacrylate, or a combination thereof. In a preferred embodiment, the second monomer comprises 1,6 hexanediol diacrylate; tripropylene glycol diacrylate, or trimethyolpropane diacrylate or a combination thereof.

In another embodiment, the second monomer has three acrylate groups. Examples of triacrylates useful in the present invention include, but are not limited to, trimethylolpropane triacrylate; pentaerythritol triacrylate; trimethylolpropane ethoxy triacrylate, or propoxylated glyceryl triacrylate. In a preferred embodiment, the triacrylate is trimethylolpropane triacrylate.

In another embodiment, the second monomer has four or more acrylate groups. Examples of these acrylates include, but are not limited to, pentaerythritol tetraacrylate; dimethylolpropane tetraacrylate, or ethoxylated pentaerythritol tetraacrylate.

In one embodiment, the first monomer is tridecyl acrylate and the second monomer is tripropylene glycol diacrylate. In another embodiment, the first monomer is tridecyl acrylate and isobornyl acrylate and the second monomer is 1,6-hexanediol diacrylate. In another embodiment, the first monomer is tridecyl acrylate and the second monomer is 1,6-hexanediol diacrylate. In another embodiment, the first monomer is tridecyl acrylate and the second monomer is trimethylolpropane triacrylate.

In one embodiment, the first monomer is isodecyl acrylate and the second monomer is tripropylene glycol diacrylate. In another embodiment, the first monomer is isodecyl acrylate and isobornyl acrylate and the second monomer is 1,6-hexanediol diacrylate. In another embodiment, the first monomer is isodecyl acrylate and the second monomer is 1,6-hexanediol diacrylate. In another embodiment, the first monomer is isodecyl acrylate and the second monomer is trimethylolpropane triacrylate.

In one embodiment, the first monomer is octyl acrylate and decyl acrylate and the second monomer is tripropylene glycol diacrylate. In another embodiment, the first monomer is octyl acrylate, decyl acrylate and isobornyl acrylate and the second monomer is 1,6-hexanediol diacrylate. In another embodiment, the first monomer is octyl acrylate and decyl acrylate and the second monomer is 1,6-hexanediol diacrylate. In another embodiment, the first monomer is octyl acrylate and decyl acrylate and the second monomer is trimethylolpropane triacrylate.

In one embodiment, the amount of second monomer is from 2 to 20%, preferably from 5 to 15% by weight of the total composition.

The use of a photoinitiator is required to induce crosslinking of component (a) and polymerization of the functional monomers. In one embodiment, the photoinitiator comprises a cationic initiator and a free-radical initiator. It is known in the art that cationic initiators can induce crosslinking of component (a) (see U.S. Pat. No. 5,536,772 to Dillman et al.). It also known in the art that free-radical initiators can initiate the polymerization of acrylate monomers.

In one embodiment, the cationic initiator comprises diaryl iodonium hexafluoroantimonate, triaryl sulfonium hexafluoroantimonate, triaryl sulfonium or hexafluorophosphate or a combination thereof. Triaryl sulfonium hexafluoroantimonate and triaryl sulfonium hexafluorophosphate are used as 50% by weight in propylene carbonate. In a preferred embodiment, the cationic initiator is diaryl iodonium hexafluoroantimonate, which is sold under the tradename SARTOMER CD1012®, which is manufactured by Sartomer, Exton, Pa. In another embodiment, the cationic initiator is from 0.15 to 1.50% by weight, preferably from 0.30 to 0.60% by weight of the total composition. In one embodiment, the cationic initiator is incorporated within the primary coating upon curing. Upon exposure to ultraviolet light, the cationic initiator is converted to a cationic species, which increases the acidic character of the cured coating. Consequently, the glass fiber coated with the cured composition of the present invention will be less susceptible to fatigue failure when compared to glass fibers coated with a composition that does not contain a cationic initiator.

In one embodiment, the free-radical initiator comprises 2,2-dimethoxy-2-phenylacetophenone; 1-hydroxycyclohexyl phenyl ketone; 2-methyl-1-{4-(methylthio)phenyl}-2-morpholinopropanone-1,2-benzyl-2-N,N-dimethylamino-1-(4-morpholinophenyl)-1-butanone; 2-hydroxy-2-methyl-1-phenyl-propan-1-one, 4-(2-hydroxyethoxy)phenyl-(2-propyl)ketone; 2,4,6-{trimethylbenzoyldiphenylphosphine}oxide; or benzophenone; or a combination thereof. In another embodiment, the free-radical initiator is ESACURE KB1®, ESACURE EB3®, ESACURE TZT®, ESACURE KIP 100®, or ESACURE KT37®, which are manufactured by Sartomer, Exton, Pa. In a preferred embodiment, the free-radical initiator comprises 2,2-dimethoxy-2-phenylacetophenone, or 1-hydroxycyclohexyl phenyl ketone, or a combination thereof. 2,2-Dimethoxy-2-phenylacetophenone is sold under the tradename IRGACURE 651® and 1-hydroxycyclohexyl phenyl ketone is sold under the tradename IRGACURE 184®, both manufactured by Ciba-Geigy, Hawthorne, N.Y. The selection of the free-radical initiator depends upon the wavelength profile of the UV source. In another embodiment, the free-radical initiator is from 0.5 to 5.0% by weight, preferably from 1.0 to 2.5% by weight of the total composition.

The invention further relates to a radiation curable primary coating composition for coating an optical fiber, comprising:

(a) a component having a first end and a second end, comprising:
   i) a saturated aliphatic backbone, and
   ii) at least one epoxide group at the first end of component (a), and at least one first reactive functional group at the second end of component (a); and (b) a mixture of monomers, comprising
   iii) a first monomer having one acrylate group or vinyl ether group, and
   iv) a second monomer having at least two functional groups, comprising a second functional group and a third functional group, and (c) a photoinitiator.

Applicant has discovered that the first monomer having one acrylate group can be combined with a second monomer having at least two functional groups. In one embodiment, the first functional group of component (a) and the second and third functional groups of the second monomer comprises an acrylate group, an epoxy group, a vinyl ether group, a hydroxyl group, or a combination thereof. In one embodiment, the first monomer is a vinyl ether and the second and third functional group is an acrylate group. In a preferred embodiment, the first, second, and third functional group is an acrylate group. In this embodiment of the invention, the acrylates described above can be used as the first and second monomers.

In another embodiment, the second monomer is a vinyl ether. Examples of vinyl ethers useful in the present invention include, but are not limited to, triethylene glycol divinyl ether; cyclohexanedimethanol divinyl ether; dodecyl vinyl ether; diethylene glycol divinyl ether; dipropylene glycol divinyl ether; hexanediol divinyl ether; butanediol divinyl ether; ethylene glycol divinyl ether; tetraethylene glycol divinyl ether; trimethylolpropane trivinyl ether; poly-tetrahydrofuran divinyl ether; 1,3-benzenedicarboxylic acid, bis-{4-ethenyloxy)butyl}ester; pentanedioic acid, bis-{{4-{(ethenyloxy)methyl}cyclohexyl}methyl}ester; butanedioic acid, bis-{4-(ethenyloxy)butyl}ester; hexanedioic acid, bis-{4-(ethenyloxy)butyl}ester; 1,2,4-benzenetricarboxylic acid, or tris-{4-(ethenyloxy)butyl}ester or a combination thereof.

The invention further relates to a radiation curable primary coating composition for coating an optical fiber, comprising:

(a) a component having a first end and a second end, comprising:
  i) a saturated aliphatic backbone, and
  ii) at least one epoxide group at the first end of component (a), and at least one reactive functional group at the second end of component (a); and
(b) a mixture of vinyl ether monomers, comprising
  iii) a first monomer having one vinyl ether group, and
  iv) a second monomer having at least two vinyl ether groups; and
(c) a photoinitiator.

In one embodiment, the first monomer comprises hydroxybutyl vinyl ether; propenylether of propylene carbonate; dodecyl vinyl ether; cyclohexyl vinyl ether; 2-ethylhexyl vinyl ether; octadecyl vinyl ether; 1-butanol, 4-(ethenyloxy)-, benzoate; cyclohexanemethanol, 4-{(ethenyloxy)methyl}-, benzoate; ethyl vinyl ether; propyl vinyl ether; isobutyl vinyl ether; butyl vinyl ether; ethylene glycol monovinyl ether; ethylene glycol butyl vinyl ether; triethylene glycol methyl vinyl ether; cyclohexanedimethanol vinyl ether; tert-butyl vinyl ether; tert-amyl vinyl ether; diethylene glycol monovinyl ether; hexanediol monovinyl ether; amino propyl vinyl ether; or 2-diethylaminoethyl vinyl ether, or a combination thereof.

In another embodiment, the second monomer comprises triethylene glycol divinyl ether; cyclohexanedimethanol divinyl ether; dodecyl vinyl ether; diethylene glycol divinyl ether; dipropylene glycol divinyl ether; hexanediol divinyl ether; butanediol divinyl ether; ethylene glycol divinyl ether; tetraethylene glycol divinyl ether; trimethylolpropane trivinyl ether; poly-tetrahydrofuran divinyl ether; 1,3-benzenedicarboxylic acid, bis-{4-ethenyloxy)butyl}ester; pentanedioic acid, bis-{{4-{(ethenyloxy)methyl}cyclohexyl}methyl}ester; butanedioic acid, bis-{4-(ethenyloxy)butyl}ester; hexanedioic acid, bis-{4-(ethenyloxy)butyl}ester; 1,2,4-benzenetricarboxylic acid, or tris-{4-(ethenyloxy)butyl}ester, or a combination thereof.

In one embodiment, when the first monomer is a vinyl ether, the amount of the first monomer is from 10 to 50% by weight of the total composition. In one embodiment, when the second monomer possesses at least two vinyl ether groups, the amount of the second monomer is from 2 to 20% by weight of the total composition.

In one embodiment, when component (b) is a mixture of vinyl ethers, the photoiniator comprises a cationic initiator. A free-radical initiator is not required in this particular embodiment of the present invention.

The addition of other additives or components can be added to the primary coating composition of the present invention. In one embodiment, the primary coating composition comprises an adhesion promoter, a thermal oxidative stabilizer, or a combination thereof. In another embodiment, the composition comprises an adhesion promoter and a thermal oxidative stabilizer.

The adhesion promoter provides increased adhesion between the glass fiber and the primary coating. In one embodiment, the adhesion promoter comprises an organofunctional silane. The term "organofunctional silane" is defined as a silyl compound with functional groups that facilitate the chemical or physical bonding between the glass surface and the silane, which ultimately results in increased or enhanced adhesion between the primary coating and the glass fiber.

In one embodiment, the adhesion promoter comprises octyltriethoxysilane, methyltriethoxysilane, methyltrimethoxysilane, tris-{3-trimethoxysilyl)propyl}isocyanurate, vinyltriethoxysilane, vinyltrimethoxysilane, vinyl-tris-(2-methoxyethoxy)silane, vinylmethyldimethoxysilane, gamma-methacryloxypropyltrimethoxysilane, beta-(3,4-epoxycyclohexyl)ethyltrimethoxysilane, gamma-glycidoxypropyltrimethoxysilane, gamma-mercaptopropyltrimethoxysilane, bis-(3-{triethoxysilyl}-propyl-tetrasulfane, gamma-aminopropyltriethoxysilane, aminoalkylsilicone, gamma-aminopropyltrimethoxysilane, N-beta-(aminoethyl)-gamma-aminopropyltrimethoxysilane, bis-(gamma-trimethoxysilylpropyl)amine, N-phenyl-gamma-aminopropyltrimethoxysilane, organomodified polydimethylsiloxane, N-beta-(aminoethyl)-gamma-aminopropylmethyldimethoxysilane, gamma-ureidopropyltrialkoxysilane, gamma-ureidopropyltrimethoxysilane, or gamma-isocyanatopropyltriethoxysilane, or a combination thereof. In a preferred embodiment, the adhesion promoter is gamma-methacryloxypropyltrimethoxysilane, which is sold under the tradename SILQUEST A-174® manufactured by OSi Specialties, Inc., Endicott, N.Y., U.S.A.

In one embodiment, the amount of adhesion promoter is from 0.1 to 2.5% by weight, preferably from 0.3 to 1.5% by weight of the total composition.

The thermal oxidative stabilizer inhibits oxidation and thermal degradation of the coating composition. In one embodiment, the thermal oxidative stabilizer comprises octadecyl 3,5-di-tert-butyl-4-hydroxyhydrocinnamate, 3,5-bis-(1,1-dimethylethyl)-4-hydroxybenzenepropanoic acid, 2,2,-bis{{3-{3,5-bis-(1,1-dimethylethyl)-4-hydroxyphenyl}-1-oxopropoxy}methyl}-1,3-propanediyl ester, or thiodiethylene bis-(3,5-tert-butyl-4-hydroxy) hydrocinnamate, or a combination thereof. In a preferred embodiment, the thermal oxidative stabilizer is octadecyl 3,5-di-tert-butyl-4-hydroxyhydrocinnamate, which is sold under the tradename IRGANOX1076®, manufactured by Ciba-Geigy, Tarrytown, N.Y.

In another embodiment, the thermal oxidative stabilizer is from 0.1 to 4.0% by weight, preferably from 0.15 to 2.5% by weight of the total composition.

In another embodiment, the primary coating compositions of the present invention are substantially free of a tackifying resin. In one embodiment, no tackifying resin is present in the composition. Applicant has discovered that a tackifying resin is not needed to produce a primary coating composition with superior physical properties. The prior art teaches that a tackifying resin has to be present in the coating composition when using polymers similar to those of component (a) of the present invention to coat an optical fiber (see U.S. Pat. No. 5,536,772 to Dillman et al.). As shown in the forthcoming examples, when a tackifying resin is incorporated in the coating composition of the present invention, the resultant composition is inferior to the coating composition of the present invention.

In another embodiment, component (a) is from 40 to 80% by weight of the total composition, the acrylate monomers are from 15 to 50% by weight of the total composition, the photoinitiator is from 1.25 to 5.5% by weight of the total composition, the adhesion promoter is from 0.2 to 2.5% by weight of the total composition, and the thermal oxidative stabilizer is from 0.1 to 4.0% by weight of the total composition, wherein the sum of the amount of component (a), the acrylate mixture, the photoinitiator, the adhesion promoter, and the thermal oxidative stabilizer is equal to 100%.

In another embodiment, component (a) is from 60 to 75% by weight of the total composition, the acrylate monomers from 20 to 40% by weight of the total composition, the photoinitiator is from 1.9 to 3.1% by weight of the total composition, the adhesion promoter is from 0.2 to 2.5% by weight of the total composition, and the thermal oxidative stabilizer is from 0.1 to 4.0% by weight of the total composition, wherein the sum of the amount of component (a), the acrylate mixture, the photoinitiator, the adhesion promoter, and the thermal oxidative stabilizer is equal to 100%.

In another embodiment, component (a) is L-207, the first monomer is tridecyl acrylate, the second monomer is tripropylene glycol diacrylate, the free-radical initiator is 1-hydroxycyclohexyl phenyl ketone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is isodecyl acrylate, the second monomer is tripropylene glycol diacrylate, the free-radical initiator is 1-hydroxycyclohexyl phenyl ketone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is tridecyl acrylate, the second monomer is tripropylene glycol diacrylate, the free-radical initiator is 2,2-dimethoxy-2-phenylacetophenone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is isodecyl acrylate, the second monomer is tripropylene glycol diacrylate, the free-radical initiator is 2,2-dimethoxy-2-phenylacetophenone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is tridecyl acrylate and isobornyl acrylate, the second monomer is 1,6-hexanediol diacrylate, the free-radical initiator is 2,2-dimethoxy-2-phenylacetophenone, the cationic initiator is diaryl iodonium hexafluoroantimonate, and the adhesion promoter is gamma-methacryloxypropyltrimethoxysilane.

In another embodiment, component (a) is L-207, the first monomer is isodecyl acrylate, the second monomer is tripropylene glycol diacrylate, the free-radical initiator is 2,2-dimethoxy-2-phenylacetophenone, the cationic initiator is diaryl iodonium hexafluoroantimonate, and the adhesion promoter is gamma-methacryloxypropyltrimethoxysilane.

In another embodiment, component (a) is EKP-206, the first monomer is tridecyl acrylate, the second monomer is 1,6-hexanediol diacrylate, the free-radical initiator is 1-hydroxycyclohexyl phenyl ketone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is EKP-206, the first monomer is tridecyl acrylate, the second monomer is 1,6-hexanediol diacrylate, the free-radical initiator is 2,2-dimethoxy-2-phenylacetophenone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is EKP-206, the first monomer is isodecyl acrylate, the second monomer is 1,6-hexanediol diacrylate, the free-radical initiator is 1-hydroxycyclohexyl phenyl ketone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is EKP-206, the first monomer is isodecyl acrylate, the second monomer is 1,6-hexanediol diacrylate, the free-radical initiator is 2,2-dimethoxy-2-phenylacetophenone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is isodecyl acrylate, the second monomer is 1,6-hexanediol diacrylate, the free-radical initiator is 1-hydroxycyclohexyl phenyl ketone, the cationic initiator is diaryl iodonium hexafluoroantimonate, and the thermal oxidative stabilizer is octadecyl-3,5-di-tert-butyl-4-hydroxyhydrocinnamate.

In another embodiment, component (a) is L-207, the first monomer is isodecyl acrylate, the second monomer is 1,6-hexanediol diacrylate, the free-radical initiator is 2,2-dimethoxy-2-phenylacetophenone, the cationic initiator is diaryl iodonium hexafluoroantimonate, and the thermal oxidative stabilizer is octadecyl-3,5-di-tert-butyl-4-hydroxyhydrocinnamate.

In another embodiment, component (a) is L-207, the first monomer is tridecyl acrylate, the second monomer is trimethyolpropane triacrylate, the free-radical initiator is 2,2-dimethoxy-2-phenylacetophenone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is tridecyl acrylate, the second monomer is trimethyolpropane triacrylate, the free-radical initiator is 1-hydroxycyclohexyl phenyl ketone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is isodecyl acrylate, the second monomer is trimethyolpropane triacrylate, the free-radical initiator is 2,2-dimethoxy-2-phenylacetophenone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

In another embodiment, component (a) is L-207, the first monomer is isodecyl acrylate, the second monomer is trimethyolpropane triacrylate, the free-radical initiator is 1-hydroxycyclohexyl phenyl ketone, the cationic initiator is diaryl iodonium hexafluoroantimonate, the thermal oxidative stabilizer is octadecyl-3,5-di-tert-butyl-4-hydroxyhydrocinnamate, and the adhesion promoter is gamma-methacryloxypropyltrimethoxysilane.

The primary coating compositions of the present invention exhibit superior physical properties. In one embodiment, the primary coating composition has a viscosity of from 2,000 to 15,000 centipoise, preferably from 4,000 to 7,000 centipoise. In another embodiment, the primary coating has a tensile modulus of from 1.0 to 5.0, preferably from 1.5 to 3.0 MPa. In another embodiment, the primary coating has a tensile elongation at break greater than 50%, preferably greater than 90%. In another embodiment, the primary coating has a glass transition temperature less than −20° C., preferably lower than −30° C. In another embodiment, the primary coating has an oxidation of induction temperature greater than 230° C., preferably greater than 240° C. In another embodiment, the primary coating has a modulus stability at 85° C./85% RH for 29 days of less than 20% change, preferably less than or equal to 10% change. In another embodiment, the primary coating has a weight loss at 125° C. for 7 days of less than 10%. In another embodiment, the primary coating has a water absorption of less than 2.0%, preferably less than 1.0%.

The invention further relates to a radiation curable primary coating composition for coating an optical fiber, comprising:
(a) a component having a first end and a second end, comprising:
   i) a saturated aliphatic backbone, and
   ii) at least one epoxide group at the first end of component (a), and at least one reactive functional group at the second end of component (a);
(b) a monoacrylate having from 6 to 20 carbon atoms; and
(c) a photoinitiator.

Although this embodiment may be inferior in performance to the embodiments of the invention having a mixture of a monomer having one acrylate or vinyl ether group and a monomer having at least two functional groups, it is still intended that the monoacrylate embodiment be within the scope of the present invention. This embodiment still provides operable and advantageous properties. For example, the monoacrylates used in the present invention exhibit greater compatibility with the liquid polymer when compared to multifunctional acrylates. In a preferred embodiment, the monoacrylate is an acrylate from $C_8$ to $C_{15}$.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one reactive functional group at the second end of component (a); and
(b) a mixture of acrylate monomers, comprising
   iii) a first monomer having one acrylate group, and
   iv) a second monomer having at least two acrylate groups; and
(c) a photoinitiator,
wherein the composition has been cured as the primary coating composition on the optical fiber.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one first reactive functional group at the second end of component (a); and
(b) a mixture of monomers, comprising
   iii) a first monomer having one acrylate group or vinyl ether group, and
   iv) a second monomer having at least two functional groups, comprising a second functional group and a third functional group, and
(c) a photoinitiator,
wherein the composition has been cured as the primary coating composition on the optical fiber.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one reactive functional group at the second end of component (a); and
(b) a mixture of vinyl ether monomers, comprising
   iii) a first monomer having one vinyl ether group, and
   iv) a second monomer having at least two vinyl ether groups; and
(c) a photoinitiator,
wherein the composition has been cured as the primary coating composition on the optical fiber.

The invention further relates to an article comprising an optical fiber and a cured composition wherein the cured composition comprises:
(a) a component having a first end and a second end, comprising:
   i) a saturated aliphatic backbone, and
   ii) at least one epoxide group at the first end of component (a), and at least one reactive functional group at the second end of component (a);
(b) a monoacrylate having from 6 to 20 carbon atoms; and
(c) a photoinitiator,
wherein the composition has been cured as the primary coating composition on the optical fiber.

The coating composition of the present invention can be applied to an optical fiber and cured using techniques known in the art. In one embodiment, the coating composition is cured by exposing components (a)–(b) and the photoinitiator to radiation, preferably ultraviolet radiation.

In one embodiment, the coating composition of the present invention can be applied to the fiber in-line by fiber drawing. The coating is applied to the fiber and cured before the fiber comes into contact with the draw tower capstan, which pulls the fiber from the glass preform. In another embodiment, the primary coating can be applied to the fiber and cured followed by the application and curing of the secondary coating. In another embodiment, the primary coating of the present invention and the secondary coating can be applied to the fiber together by a coextrusion process followed by curing.

Typically, nitrogen blankets are used within the cure area to prevent oxygen from inhibiting the curing of the functional monomers of the present invention. One can vary the application pressure within the coating applicator and the number of cure lamps to optimize applications for a given line speed.

EXAMPLES

The following examples are put forth so as to provide those of ordinary skill in the art with a complete disclosure and description of how the compositions and articles claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

General Considerations

Viscosity was measured on a Brookfield LVT Viscometer with the Brookfield Thermosel using Splindle #34.

Ambient tensile properties were determined on a Thwing-Albert Intellect 500 Tensile Tester at a strain rate of 50%/min. Test samples were prepared by curing approximately 0.004 in. thick samples at 40° C. on glass plates with either a Fusion Systems H bulb or D bulb at a cure dose of approximately 500 mj/cm$^2$. The coatings were applied with a Bird applicator. An H bulb was used with formulations containing IRGACURE 184® and a D bulb was used with formulations containing IRGACURE 651®. The modulus reported is the tangent modulus to the intercept.

The D bulb cure dose requirement when using IRGACURE 651® is approximately 350 mj/cm$^2$. The H bulb cure dose requirement when using IRGACURE 184® is approximately 350 mj/cm$^2$.

Tensile modulus at −40° C. was calculated from data obtained on a Mettler TMA 40 run in the dynamic mode, using a dynamic load of +/−0.03 Newtons on a sample having an approximate thickness of 0.010 in.

The glass transition temperature was determined on a Rheometrics RSA2 at 1 rad/second.

The oxidation induction temperature was determined on a Perkin Elmer DSC4 Differential Scanning Calorimeter at a programmed heat rate of 10° C./min under an oxygen atmosphere.

Aged Film Properties

Samples prepared as described below were placed in a Blue M Poweromatic 60 temperature/humidity oven at 85° C./85% relative humidity for various periods then removed from the oven and allowed to equilibrate at ambient temperature for at least 24 hours. The tensile properties were then determined.

Weight Loss

A film having an approximate thickness of 0.004 in. thick was placed in a forced air oven at 125° C. and removed at intervals to measure weight loss.

Adhesion to Glass

Glass plates were cleaned in ethanol/KOH solution, rinsed with water then dried. The coatings were then applied and cured as previously described below. Samples were allowed to sit at ambient temperature for 2 days before testing or placing in water. When the sample was placed in water, testing was performed immediately after removing the sample from water (within 3 minutes).

The peel test was performed by placing a support tape on the top of the cured film and then scoring a 1.0 in. wide strip down through the tape and film composite. A 180 degree peel test was then performed using the tensile equipment previously described.

Water Absorption

Samples were placed in water for 24 hours then immediately dried and weighed after removal from the water. The saturated samples were then placed in a desiccator for 48 hours and reweighed. The water absorption is reported as the % weight loss between the wet and dry samples.

Example 1—Preparation of Primary Coating Composition

The oligomer, monomers, and the thermal oxidative stabilizer were placed in a vessel and mixed under low shear for several minutes. This mixture was then heated to approximately 60° C. with continued mixing until the stabilizer was in solution and the blend was homogeneous. The free radical initiator was then added, and mixing was continued at 60° C. until the initiator was in solution. The cationic initiator was added and the temperature was raised to about 90° C. Mixing was continued until the cationic initiator was in solution. The blend was cooled to below 60° C. and the adhesion promoter was added followed by mixing to assure a homogeneous blend.

Laboratory testing to obtain coating properties were conducted without filtering the composition. When the coating was applied to a fiber, the coating was filtered through a 0.8 micron rated filter.

In another method, the stabilizer and initiators were dissolved in the functionalized monomers of the present invention at an elevated temperature. The solution was prefiltered through a 0.45 micron rated filter. The remaining components were then added to the mixing vessel and blended at 60° C. until the blend was homogeneous. The adhesion promoter was added as described above. Filtration of the resultant coating composition was performed. This method provides an improved degree of particle removal from the coating composition.

Example 2

The coating compositions from Example 1 (A–J) were tested for various properties as set forth in Table 2 below.

Primary coating compositions of the present invention that were tested are shown in Table 1. All amounts are expressed as parts by weight. The coatings were designed to have viscosities at room temperature of about 5000 centipoise. To obtain higher or lower viscosities, the component ratios can be adjusted without significantly effecting the cured properties of the coating composition.

The use of monofunctional acrylates ($C_{10}$ and greater) facilitates the solubility of other monoacrylates and multifunctional acrylates that have limited solubility in the liquid polymer. For example, when isooctyl acrylate is used in place of tridecyl acrylate in Formulation A of Table 1, the compatibility of the tripropyleneglycol diacrylate is marginal. When isodecyl acrylate is used, however, compatibility is acceptable. This type of behavior was observed with other monomers such as trimethylolpropane diacrylate, which are less soluble in the liquid polymer than tripropyleneglycol diacrylate.

Primary coatings when cured generally have a modulus in the range of from 1.5 to 3.0 MPA. These values assure that fiber signal attenuation will be acceptable at ambient temperature. In addition, the cured coating should have a low glass transition temperature in order to maintain acceptable transmission properties down as low as −40° C.

The majority of the coating compositions in Table 1 exhibit excellent low temperature behavior. Table 2 reveals that by varying the difunctional monomer concentration or monomer rigidity, the tensile properties of the coating composition can be affected. For example, increasing the amount tripropylene glycol diacrylate increases the modulus, particularly at low temperature, which was observed for formulation C when compared to formulations A and B (Table 2). Using isobornyl acrylate (formulation E) also increases the modulus because of its rigid ring structure.

The weight loss data in Table 2 demonstrates how increasing the crosslink density decreases the weight loss at 125° C.

Of particular note in Table 2 is the exceptional stability of the cured coating when exposed to high temperature, high humidity conditions (85° C./85% relative humidity) for extended time. The water absorption data also reflect the excellent hydrophobic character of these coatings. For example, the coating compositions disclosed in U.S. Pat. Nos. 5,536,529 and 5,538,791 to Shustack exhibit water absorption no better than 1.4%. This value is significantly higher when compared to formulations A, C, and E–H in Table 2.

In Table 2, the modulus of formation for formulation A was measured at 10 months. The modulus was essentially the same at 10 months when compared to the modulus formation of the coating when it was initially prepared. This data indicates that the coating compositions of the present invention exhibit high stability and good shelf-life over extended periods of time.

TABLE 1

| FORMULATION[a] | A | B | C | D | E | F | G | H | I | J |
|---|---|---|---|---|---|---|---|---|---|---|
| COMPONENTS | | | | | | | | | | |
| SHELL L-207 | 65 | 65 | 65 | 65 | 65 | 65 | — | 65 | 65 | 65 |
| SHELL EKP 206 | — | — | — | — | — | — | 65 | — | — | — |
| TRIDECYLACRYLATE | 25 | 25 | 20 | 22.5 | 17.5 | 25 | 25 | 30 | 25 | |
| TRIPROPYLENE GLYCOL DIACRYLATE | 10 | 10 | 15 | 12.5 | — | — | 10 | — | — | 10 |
| 1,6-HEXANEDIOL DIACRYLATE | — | — | — | — | 7.5 | 10 | — | 10 | — | — |
| ISODECYLACRYLATE | — | — | — | — | — | — | — | 25 | — | — |
| ISOBORNYL ACRYLATE | — | — | — | — | 10 | — | — | — | — | — |
| TRIMETHYLOLPROPANE TRIACRYLATE | — | — | — | — | — | — | — | — | 5 | — |
| Octadecyl 3,5-di-tert-butyl-4-hydroxyhydrocinnamate (IRGANOX 1076) | 2 | 2 | 2 | 2 | 2 | 2 | 2 | 2 | 1 | 1 |
| 1-Hydroxycyclohexyl phenyl ketone (IRGACURE 184) | 2 | 2 | 2 | — | — | 2 | 2 | 2 | — | — |
| 2,2-dimethoxy-2-phenylacetophenone (IRGACURE 651) | — | — | — | 2 | 2 | — | — | — | 2 | 2 |
| Diaryl Iodonium Hexafluoroantimonate (SARTOMER CD-1012) | 0.5 | 0.5 | 0.5 | 0.5 | 0.5 | 0.5 | 0.5 | 0.5 | — | 0.5 |
| gamma-Methacryloxypropyl trimethoxysilane (SILQUEST A-174) | 0.5 | 1.0 | 0.5 | 0.5 | 0.5 | — | 0.5 | — | — | 0.5 |

[a]All formulations are in parts by weight.

TABLE 2

| FORMULATION: | A | B | C | D | E | F | G | H | I | J |
|---|---|---|---|---|---|---|---|---|---|---|
| PROPERTIES | | | | | | | | | | |
| VISCOSITY, cps @ 25° C. | 5350 | 5350 | 6500 | 5600 | 4850 | 4510 | 8550 | | 7100 | 5250 |
| TENSILE @ 25° C. | | | | | | | | | | |
| Modulus, MPA | 2.2 | 2.3 | 2.7 | 2.3 | 3.0 | 2.1 | 1.9 | 2.7 | 1.9 | 2.8 |
| Break Str., MPa (maximum reading) | 3.3 | 2.6 | 3.6 | 2.9 | 3.3 | 2.9 | 2.0 | 2.9 | 2.4 | 2.5 |
| Elongation, % (maximum reading) | 150 | 131 | 129 | 140 | 130 | 135 | 111 | 116 | 161 | 94 |
| TENSILE @ –40° C., Modulus, MPa (Mettler DTMA @ 1/12 hertz) | | 5.3 | 9.0 | 6.9 | 11.0 | | 140 at –40° C. 33 at 20° C. | 6.3 | | |
| Tg ° C. (tan δ @ 1 rad/second) | –40 | | | | | | | | | |
| Oxidation Induction Temperature, ° C. | | 243 | 243 | 248 | 244 | | | | 240 | |
| Aged Film Properties | | | | | | | | | | |

TABLE 2-continued

| FORMULATION: | A | B | C | D | E | F | G | H | I | J |
|---|---|---|---|---|---|---|---|---|---|---|
| 85° C./85% RH AGING | | | | | | | | | | |
| Modulus, MPa | | | | | | | | | | |
| 0 days | | 2.3 | 2.7 | | | | | | | |
| 14 days | | 2.4 | 3.0 | | | | | | | |
| 29 days | | 2.3 | 2.7 | | | | | | | |
| Elongation, % | | | | | | | | | | |
| 0 days | | 131 | 129 | | | | | | | |
| 14 days | | 95 | 116 | | | | | | | |
| 29 days | | 144 | 138 | | | | | | | |
| Weight Loss @ 125° C. | | | | | | | | | | |
| 1 day | 8.4 | 9.5 | 6.8 | 6.4 | 6.9 | | | | 6.6 | |
| 7 days | 9.0 | 9.9 | 7.4 | 6.9 | 7.6 | | | | 7.3 | |
| 22 days | 9.6 | 10.5 | 8.0 | | | | | | | |
| Adhesion to Glass, g/in (10 in/min, 180° peel) | | | | | | | | | | |
| dry | 45 | 55 | 75 | | | | | | | |
| wet (11 days in water) | 25 | 30 | 30 | | | | | | | |
| Water Absorption (%) | 0.4 | | 0.5 | | 1.2 | 0.8 | 0.4 | 1.4 | | |

Example 3

Fiber Coating and Testing

Formulations B and E from Example 1 were applied to an optical fiber using commercial fiber coating equipment. A urethane acrylate formulation was used as the secondary coating. The control fiber was coated with an acrylate coating used in the prior art that does not contain component (a) of the present invention. The fiber coated with formulations B and E displayed superior static fatigue properties relative to the control (Table 3). The data in Table 3 demonstrates the significance of using component (a) of the present invention with respect to enhancing or increasing the static fatigue of an optical fiber.

TABLE 3

Optical Fiber Static Fatigue in Two Point Bending (at 85° C./85% RH)

| Formulation | Load (ksi) | Time to Failure (hours) |
|---|---|---|
| B | 442 | 24 |
| | 407 | 375 |
| E | 442 | 70 |
| | 407 | >1440[a] |
| control | 442 | 0.75 |
| | 407 | 2.8 |

[a]The test was terminated after 1440 hours.

Example 4

Formulation B was evaluated with respect to transmission properties in a temperature cycling test at from −60° C. to 70° C. The test was done with fibers in basket weave and loose wind configurations. Formulation B was superior in loss (lower signal attenuation) than the control at −40° C. and −60° C., and was equivalent to the control at and above room temperature. Controls were fibers coated with commercial acrylate coatings. The control fiber was drawn from the same preform as the test fiber.

Example 5

When formulation B was cured by ultraviolet radiation, the resultant film had a modulus of about 2.3 MPA at 25° C. In order for the primary coating to be useful in fiber optics, the modulus should not be lower than 1.7 MPA. When the tackifying resin REGALREZ 1085® (20 parts per 100 parts L-207) was added to formulation B, the modulus of the film decreased to about 1.2 MPA. Moreover, the viscosity of the formulation increased to about 10,000 cps at 25° C. Finally, the tackifying resin can migrate out of the coating because the resin does not crosslink with the functionalized monomers or component (a) of the present invention upon curing.

This data demonstrates that it is undesirable and unnecessary to use a tackifying resin in a coating composition for an optical fiber. The absence of a tackifying resin in one embodiment of the coating composition of the present invention is yet another advantage of the invention.

Example 6

Formulations K–M were prepared in order to demonstrate the significance of using a multifunctional monomer in combination with a mono functional monomer. Formulations K–M were prepared with a monofunctional monomer in the absence of a multifunctional monomer (Table 4). Formulations K–M were cured at 500 mj/cm² using a Fusion Systems D bulb. The weight loss of formulations K–M after 1 day at 125° C. was greater than 11%. This value is higher than those observed for formulations A–E and I in Table 2. This data reveals the added benefit of using a monofunctional monomer in combination with a multifunctional monomer when preparing a primary coating for an optical fiber in one embodiment of the invention.

TABLE 4

| Formulation[a] | K | L | M |
|---|---|---|---|
| Component | | | |
| Shell L-207 | 65 | 65 | 65 |
| tridecyl acrylate | 35 | — | 17.5 |

TABLE 4-continued

| Formulation[a] | K | L | M |
|---|---|---|---|
| isobornyl acrylate | — | 35 | 17.5 |
| IRGANOX 1076 ® | 1.0 | 1.0 | 1.0 |
| IRGACURE 651 ® | 2.0 | 2.0 | 2.0 |
| SARTOMER CD 1012 ® | 0.5 | 0.5 | 0.5 |

[a]All values expressed in parts.

Example 7

Compatibility tests of formulations A and G were conducted in Mobil SHF 402 oil. This oil is used in synthetic filling compounds that are used to waterproof optical fiber cable. In this test, a strip of cured coating (A and G) 50 mm in length was placed in the oil at 80° C. for 24 hours. The increase in length was then determined. In order to be useful as a primary coating, the coating should not increase in length by more than about 8%. Formulation A increased in length by 6% and formulation G by 1%. This data indicates that the presence of the phenyl groups in component (a) in formulation G enhances the compatibility of the coating composition. With formulation G, an increase in the glass transition temperature was observed (slightly above −20° C.); however, the increase was expected due to the presence of the phenyl groups.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A radiation curable primary coating composition for coating an optical fiber, comprising:
   (a) a component comprising at least two terminal ends, comprising:
      i) a saturated aliphatic backbone between at least two of the terminal ends, and
      ii) at least one epoxide group at one terminal end, and at least one reactive functional group at another terminal end,
      wherein the reactive functional group is not an epoxide group;
   (b) a mixture of acrylate monomers, comprising
      iii) a first monomer having one acrylate group, and
      iv) a second monomer having at least two acrylate groups; and
   (c) a photoinitiator.

2. The composition of claim 1, wherein the aliphatic backbone of component (a) is unsubstituted.

3. The composition of claim 1, wherein component (a) has an aliphatic group, a cycloaliphatic group, an aryl group or a combination thereof attached to the saturated aliphatic backbone.

4. The composition of claim 1, wherein component (a) has a phenyl group attached to the aliphatic backbone.

5. The composition of claim 1, wherein the aliphatic backbone of component (a) is poly(ethylene/butylene) or poly(ethylene/butylene/styrene).

6. The composition of claim 1, wherein component (a) contains from 5 to 15 epoxide groups.

7. The composition of claim 1, wherein component (a) contains from 9 to 11 epoxide groups.

8. The composition of claim 1, wherein the reactive functional group comprises a hydroxyl group, an acrylate group, a vinyl ether group, or a combination thereof.

9. The composition of claim 1, wherein component (a) is linear, star or radial.

10. The composition of claim 1, wherein component (a) is linear.

11. The composition of claim 1, wherein component (a) has two terminal ends, wherein component (a) has from 9 to 11 epoxide groups at one terminal end of component (a) and a hydroxyl group at the other terminal end of component (a).

12. The composition of claim 11, wherein component (a) has a molecular weight of from 3,000 to 15,000.

13. The composition of claim 11, wherein component (a) has a molecular weight of from 5,000 to 7,000.

14. The composition of claim 11, wherein component (a) has a molecular weight of 6,000.

15. The composition of claim 1, wherein component (a) is from 40 to 80% by weight of the total composition.

16. The composition of claim 1, wherein component (a) is from 55 to 75% by weight of the total composition.

17. The composition of claim 1, wherein the first monomer is an acrylate from $C_6$ to $C_{20}$.

18. The composition of claim 1, wherein the first monomer is an acrylate from $C_8$ to $C_{15}$.

19. The composition of claim 1, wherein the first monomer comprises allyl methacrylate, tetrahydrofurfuryl methacrylate, isodecyl methacrylate, 2-(2-ethoxyethoxy)-ethylacrylate, stearyl acrylate, tetrahydrofurfuryl acrylate, lauryl methacrylate, stearyl acrylate, lauryl acrylate, 2-phenoxyethyl acrylate, 2-phenoxyethyl methacrylate, glycidyl methacrylate, isodecyl acrylate, isobornyl methacrylate, isooctyl acrylate, tridecyl acrylate, tridecyl methacrylate, caprolactone acrylate, ethoxylated nonyl phenol acrylate, isobornyl acrylate, polypropylene glycol monomethacrylate or a combination thereof.

20. The composition of claim 1, wherein the first monomer comprises octyl acrylate, decyl acrylate, isobornyl acrylate, tridecyl acrylate or a combination thereof.

21. The composition of claim 1, wherein the first monomer is from 10 to 50% by weight of the total composition.

22. The composition of claim 1, wherein the first monomer is from 15 to 30% by weight of the total composition.

23. The composition of claim 1, wherein the second monomer has two acrylate groups.

24. The composition of claim 1, wherein the second monomer is an acrylate from $C_4$ to $C_{20}$.

25. The composition of claim 1, wherein the second monomer comprises 1,6-hexanediol diacrylate; tripropylene glycol diacrylate; 1,3-butylene glycol diacrylate; 1,4-butylene glycol diacrylate; neopentyl glycol diacrylate; triethylene glycol dimethacrylate; ethylene glycol dimethacrylate; tetraethylene glycol dimethacrylate; polyethylene glycol dimethacrylate; 1,3-butylene glycol diacrylate; 1,4-butanediol diacrylate; 1,4-butanediol dimethacrylate; diethylene glycol diacrylate; diethylene glycol dimethacrylate; 1,6-hexanediol diacrylate; neopentyl glycol dimethacrylate; polyethylene glycol dimethacrylate; polyethylene glycol diacrylate; tetraethylene glycol diacrylate; triethylene glycol diacrylate; dipropylene glycol diacrylate, trimethylolpropane triacrylate; pentaerythritol triacrylate; trimethylolpropane ethoxy triacrylate; propoxylated glyceryl triacrylate; pentaerythritol tetraacrylate; dimethylolpropane tetraacrylate; ethoxylated pentaerythritol tetraacrylate, or a combination thereof.

26. The composition of claim 1, wherein the second monomer comprises 1,6-hexanediol diacrylate; tripropylene glycol diacrylate, trimethyolpropane triacrylate or a combination thereof.

27. The composition of claim 1, wherein the second monomer is from 2 to 20% by weight of the total composition.

28. The composition of claim 1, wherein the second monomer is from 5 to 15% by weight of the total composition.

29. The composition of claim 1, wherein the photoinitiator comprises a cationic initiator and a free-radical initiator.

30. The composition of claim 29, wherein the cationic initiator comprises diaryl iodonium hexafluoroantimonate, triaryl sulfonium hexafluoroantimonate, triaryl sulfonium hexafluorophosphate or a combination thereof.

31. The composition of claim 29, wherein the cationic initiator is diaryl iodonium hexafluoroantimonate.

32. The composition of claim 29, wherein the cationic initiator is from 0.15 to 1.50% by weight of the total composition.

33. The composition of claim 29, wherein the cationic initiator is from 0.30 to 0.60% by weight of the total composition.

34. The composition of claim 29, wherein free-radical initiator comprises 2,2-dimethoxy-2-phenylacetophenone, 1-hydroxycyclohexyl phenyl ketone, 2-methyl-1-{4-(methylthio)phenyl}-2-morpholinopropanone-1,2-benzyl-2-N,N-dimethylamino-1-(4-morpholinophenyl)-1-butanone, 2-hydroxy-2-methyl-1-phenyl-propan-1-one, 4-(2-hydroxyethoxy)phenyl-(2-propyl)ketone, 2,4,6-{trimethylbenzoyldiphenylphosphine}oxide, benzophenone, or a combination thereof.

35. The composition of claim 29, wherein the free-radical initiator comprises 2,2-dimethoxy-2-phenylacetophenone or 1-hydroxycyclohexyl phenyl ketone.

36. The composition of claim 29, wherein the free-radical initiator is from 0.5 to 5.0% by weight of the total composition.

37. The composition of claim 29, wherein the free-radical initiator is from 1.0 to 2.5% by weight of the total composition.

38. The composition of claim 1, wherein the composition further comprises an adhesion promoter, a thermal oxidative stabilizer, or a combination thereof.

39. The composition of claim 1, wherein the composition further comprises an adhesion promoter and a thermal oxidative stabilizer.

40. The composition of claim 38, wherein the adhesion promoter comprises an organofunctional silane.

41. The composition of claim 38, wherein the adhesion promoter comprises octyltriethoxysilane, methyltriethoxysilane, methyltrimethoxysilane, tris-{3-trimethoxysilyl)propyl}isocyanurate, vinyltriethoxysilane, vinyltrimethoxysilane, vinyl-tris-(2-methoxyethoxy)silane, vinylmethyldimethoxysilane, gamma-methacryloxypropyltrimethoxysilane, beta-(3,4-epoxycyclohexyl)ethyltrimethoxysilane, gamma-glycidoxypropyltrimethoxysilane, gamma-mercaptopropyltrimethoxysilane, bis-(3-{triethoxysilyl}-propyl-tetrasulfane, gamma-aminopropyltriethoxysilane, aminoalkylsilicone, gamma-aminopropyltrimethoxysilane, N-beta-(aminoethyl)-gamma-aminopropyltrimethoxysilane, bis-(gamma-trimethoxysilylpropyl)amine, N-phenyl-gamma-aminopropyltrimethoxysilane, organomodified polydimethylsiloxane, N-beta-(aminoethyl)-gamma-aminopropylmethyldimethoxysilane, gamma-ureidopropyltrialkoxysilane, gamma-ureidopropyltrimethoxysilane, gamma-isocyanatopropyltriethoxysilane, or a combination thereof.

42. The composition of claim 38, wherein the adhesion promoter is gamma-methacryloxypropyltrimethoxysilane.

43. The composition of claim 38, wherein the adhesion promoter is from 0.1 to 2.5% by weight of the total composition.

44. The composition of claim 38, wherein the adhesion promoter is from 0.3 to 1.5% by weight of the total composition.

45. The composition of claim 38, wherein the thermal oxidative stabilizer comprises octadecyl 3,5-di-tert-butyl-4-hydroxyhydrocinnamate, 3,5-bis-(1,1-dimethylethyl)-4-hydroxybenzenepropanoic acid, 2,2,-bis-{{3-{3,5-bis-(1,1-dimethylethyl)-4-hydroxyphenyl}-1-oxopropoxy}methyl}-1,3-propanediyl ester, thiodiethylene bis-(3,5-tert-butyl-4-hydroxy)hydrocinnamate, or a combination thereof.

46. The composition of claim 38, wherein the thermal oxidative stabilizer is octadecyl 3,5-di-tert-butyl-4-hydroxyhydrocinnamate.

47. The composition of claim 38, wherein the thermal oxidative stabilizer is from 0.1 to 4.0% by weight of the total composition.

48. The composition of claim 38, wherein the thermal oxidative stabilizer is from 0.15 to 2.5% by weight of the total composition.

49. The composition of claim 1, wherein the composition is substantially free of a tackifying resin.

50. The composition of claim 1, wherein upon photoinitiation, component (a) is crosslinked to form a polymeric network.

51. The composition of claim 1, wherein upon photoinitiation, component (a) is crosslinked with itself and/or the acrylate monomers.

52. The composition of claim 1, wherein the composition has a viscosity of from 2000 to 15,000 centipoise.

53. The composition of claim 1, wherein the composition has a viscosity of from 4000 to 7,000 centipoise.

54. The composition of claim 1, wherein component (a) is from 40 to 80% by weight of the total composition, the acrylate monomers are from 15 to 50% by weight of the total composition, the photoinitiator is from 1.25 to 5.5% by weight of the total composition, the adhesion promoter is from 0.2 to 2.5% by weight of the total composition, and the thermal oxidative stabilizer is from 0.1 to 4.0% by weight of the total composition, wherein the sum of the amount of component (a), the acrylate mixture, the photoinitiator, the adhesion promoter, and the thermal oxidative stabilizer is equal to 100%.

55. The composition of claim 1, wherein component (a) is from 60 to 75% by weight of the total composition, the acrylate monomers from 20 to 40% by weight of the total composition, the photoinitiator is from 1.9 to 3.1% by weight of the total composition, the adhesion promoter is from 0.2 to 2.5% by weight of the total composition, and the thermal oxidative stabilizer is from 0.1 to 4.0% by weight of the total composition, wherein the sum of the amount of component (a), the acrylate mixture, the photoinitiator, the adhesion promoter, and the thermal oxidative stabilizer is equal to 100%.

56. A radiation curable primary coating composition for coating an optical fiber, comprising:

(a) a component comprising at least two terminal ends, comprising:
  i) a saturated aliphatic backbone between at least two of the terminal ends, and
  ii) at least one epoxide group at one terminal end, and at least one first reactive functional group at another terminal end,
  wherein the first reactive functional group is not an epoxide group;
(b) a mixture of monomers, comprising
  iii) a first monomer having one acrylate group or vinyl ether group, and
  iv) a second monomer having at least two functional groups, comprising a second functional group and a third functional group, and
(c) a photoinitiator.

57. The composition of claim 56, wherein the first, second and third functional group comprises an acrylate group, an epoxy group, a vinyl ether group, a hydroxyl group, or a combination thereof.

58. The composition of claim 56, wherein the first, second and third functional group is an acrylate group.

59. The composition of claim 56, wherein the first monomer is a vinyl ether and the second and third functional groups are acrylate groups.

60. The composition of claim 56, wherein the second monomer is a vinyl ether.

61. The composition of claim 60, wherein the vinyl ether comprises triethylene glycol divinyl ether; cyclohexanedimethanol divinyl ether; dodecyl vinyl ether; diethylene glycol divinyl ether; dipropylene glycol divinyl ether; hexanediol divinyl ether; butanediol divinyl ether; ethylene glycol divinyl ether; tetraethylene glycol divinyl ether; trimethylolpropane trivinyl ether; polytetrahydrofuran divinyl ether; 1,3-benzenedicarboxylic acid, bis-{4-ethenyloxy)butyl}ester; pentanedioic acid, bis-{{4-{(ethenyloxy)methyl}cyclohexyl}methyl}ester; butanedioic acid, bis-{4-(ethenyloxy)butyl}ester; hexanedioic acid, bis-{4-(ethenyloxy)butyl}ester; 1,2,4-benzenetricarboxylic acid, tris-{4-(ethenyloxy)butyl}ester, or a combination thereof.

62. The composition of claim 56, further comprising an adhesion promoter, a thermal oxidative stabilizer, or a combination thereof.

63. The composition of claim 56, wherein the composition is substantially free of a tackifying resin.

64. A radiation curable primary coating composition for coating an optical fiber, comprising:
(a) a component comprising at least two terminal ends, comprising:
  i) a saturated aliphatic backbone between at least two of the terminal ends, and
  ii) at least one epoxide group at one terminal end, and at least one reactive functional group at another terminal end,
  wherein the reactive functional group is not an epoxide group;
(b) a mixture of vinyl ether monomers, comprising
  iii) a first monomer having one vinyl ether group, and
  iv) a second monomer having at least two vinyl ether groups; and
(c) a photoinitiator.

65. The composition of claim 64, wherein the first monomer comprises hydroxybutyl vinyl ether; propenylether of propylene carbonate; dodecyl vinyl ether; cyclohexyl vinyl ether; 2-ethylhexyl vinyl ether; octadecyl vinyl ether; 1-butanol, 4-(ethenyloxy)-, benzoate; cyclohexanemethanol, 4-{(ethenyloxy)methyl}-, benzoate; ethyl vinyl ether; propyl vinyl ether; isobutyl vinyl ether; butyl vinyl ether; ethylene glycol monovinyl ether; ethylene glycol butyl vinyl ether; triethylene glycol methyl vinyl ether; cyclohexanedimethanol vinyl ether; tert-butyl vinyl ether; tert-amyl vinyl ether; diethylene glycol monovinyl ether; hexanediol monovinyl ether; amino propyl vinyl ether; 2-diethylaminoethyl vinyl ether, or a combination thereof.

66. The composition of claim 64, wherein the second monomer comprises triethylene glycol divinyl ether; cyclohexanedimethanol divinyl ether; dodecyl vinyl ether; diethylene glycol divinyl ether; dipropylene glycol divinyl ether; hexanediol divinyl ether; butanediol divinyl ether; ethylene glycol divinyl ether; tetraethylene glycol divinyl ether; trimethylolpropane trivinyl ether; polytetrahydrofuran divinyl ether; 1,3-benzenedicarboxylic acid, bis-{4-ethenyloxy)butyl}ester; pentanedioic acid, bis-{{4-{(ethenyloxy)methyl}cyclohexyl}methyl}ester; butanedioic acid, bis-{4-(ethenyloxy)butyl}ester; hexanedioic acid, bis-{4-(ethenyloxy)butyl}ester; 1,2,4-benzenetricarboxylic acid, tris-{4-(ethenyloxy)butyl}ester, or a combination thereof.

67. The composition of claim 64, wherein the photoinitiator comprises a cationic initiator.

68. The composition of claim 64, wherein the composition further comprises an adhesion promoter, a thermal oxidative stabilizer, or a combination thereof.

69. The composition of claim 64 wherein the composition is substantially free of a tackifying resin.

70. A radiation curable primary coating composition for coating an optical fiber, comprising:
(a) a component comprising at least two terminal ends, comprising:
  i) a saturated aliphatic backbone between at least two of the terminal ends, and
  ii) at least one epoxide group at one terminal end, and at least one reactive functional group at another terminal end,
  wherein the reactive functional group is not an epoxide group;
(b) a monoacrylate having from 6 to 20 carbon atoms; and
(c) a photoinitiator.

71. The composition of claim 1, wherein the reactive functional group is a hydroxyl group.

72. The composition of claim 1, wherein component (a) has two terminal ends, wherein component (a) has from 9 to 11 epoxide groups at one terminal end of component (a), a hydroxyl group at the other terminal end of component (a), and an aliphatic group, aromatic group, a cycloaliphatic group, or a combination thereof attached to the saturated aliphatic backbone.

73. The composition of claim 1, wherein component (a) has two terminal ends, wherein component (a) has from 9 to 11 epoxide groups at one terminal end of component (a), a hydroxyl group at the other terminal end of component (a), and the saturated aliphatic backbone is poly(ethylene/butylene) or poly(ethylene/butylene/styrene).

74. The composition of claim 38, wherein
(i) component (a) has from 9 to 11 epoxide groups at one terminal end of component (a), a hydroxyl group at the other terminal end of component (a), and the saturated aliphatic backbone is poly(ethylene/butylene);
(ii) the first monomer is tridecyl acrylate;
(iii) the second monomer is tripropylene glycol diacrylate;
(iv) the photoinitiator is 2,2-dimethoxy-2-phenylacetophenone and diaryl iodonium hexafluoroantimonate;

(v) the adhesive promoter is gamma-methacryloxypropyl trimethoxysilane, gamma-mercaptopropyltrimethoxysilane, or a combination thereof; and (vi) the thermal oxidative stabilizer is octadecyl-3,5-di-tert-butyl-4-hydroxyhydrocinnamate.

75. A radiation curable primary coating composition for coating an optical fiber, comprising:
   (a) a component comprising at least two terminal ends, comprising:
      i) a saturated aliphatic backbone between at least two of the terminal ends, wherein the saturated aliphatic backbone comprises poly(ethylene/butylene) or poly(ethylene/butylene/styrene), and
      ii) at least one epoxide group at one terminal end, and at least one reactive functional group at another terminal end;
   (b) a mixture of acrylate monomers, comprising
      iii) a first monomer having one acrylate group, and
      iv) a second monomer having at least two acrylate groups; and
   (c) a photoinitiator.

* * * * *